INVENTOR.
RUDOLPH BIRMANN

United States Patent Office 3,355,878
Patented Dec. 5, 1967

3,355,878
TURBOCOMPRESSOR SYSTEM
Rudolph Birmann, Highland Farm, R.D. 1, Newtown,
Bucks County, Pa. 18940
Filed Aug. 30, 1965, Ser. No. 483,398
16 Claims. (Cl. 60—13)

ABSTRACT OF THE DISCLOSURE

A compressor-driving turbine driven by engine exhaust gases has associated with it an annular adjustable nozzle arranged to provide a high velocity jet of the exhaust gases to mix with, and provide an eductor action on, the gases exhausted from the turbine. The nozzle is controlled to open against spring action with increase of exhaust gas pressure. The mixed exhaust gases from the turbine and from the nozzle enter a diffuser to transform velocity into pressure.

---

Figure 1:
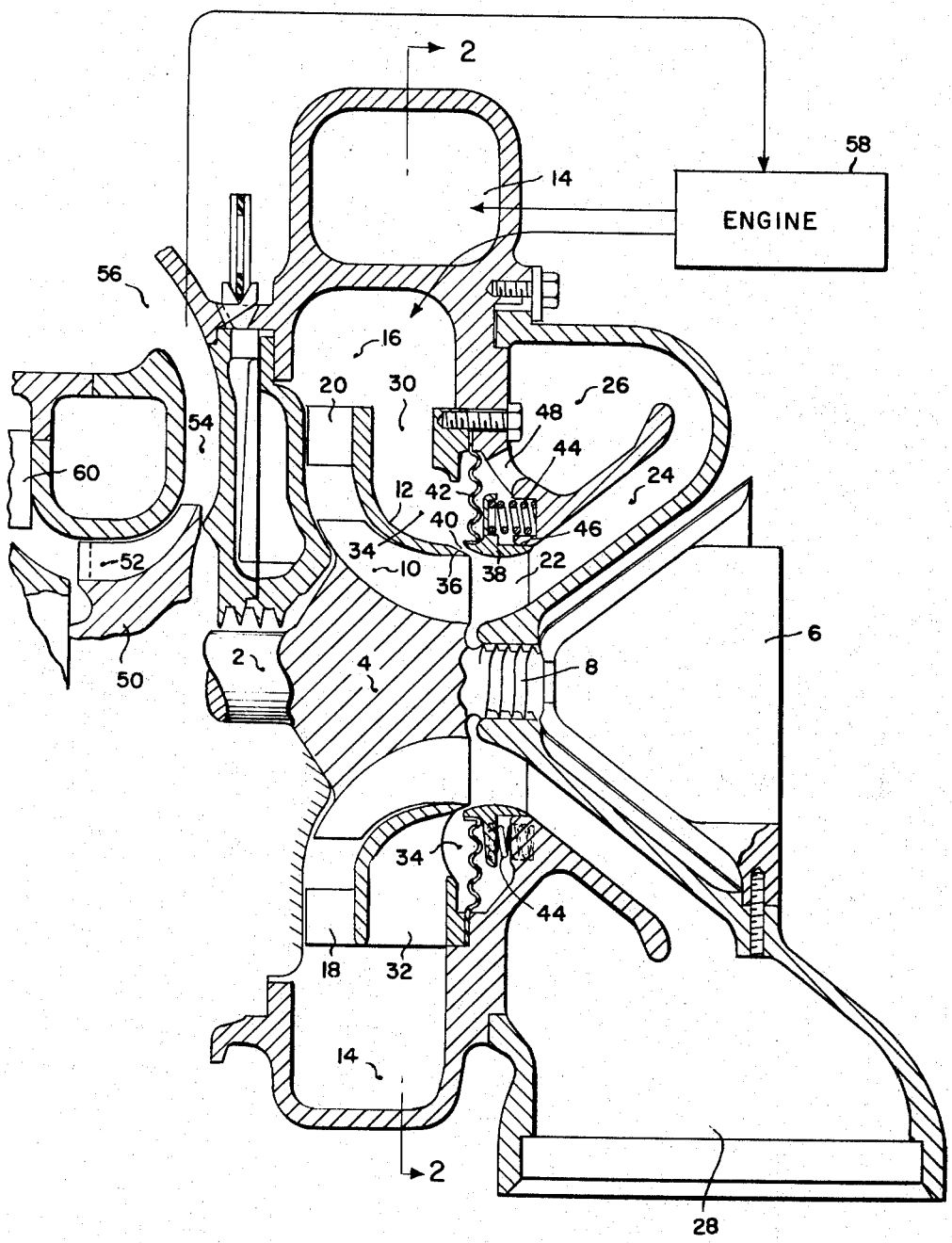

This invention relates to turbocompressor systems and has particular reference to systems involving turbochargers in association with internal combustion engines of reciprocatory type. The invention also relates to a turbine construction utilized in such systems.

In my Patent 3,059,415, dated Oct. 23, 1962, there is disclosed a turbocharger system having various advantages in a turbocharged engine power plant from the standpoint of proper operation thereof. One of the outstanding features of the system disclosed in said patent is the maintenance of high speed of a turbocompressor unit under light engine loads achieved by variation of the whirl component of air entering the compressor. Further improvements in this system are disclosed in my Patent 3,232,043, dated Feb. 1, 1966. Further advantageous aspects of a turbocompressor unit will be found in application Ser. No. 442,693, filed Mar. 25, 1965, now Patent No. 3,263,424.

It is the general object of the present invention to provide a turbocompressor unit and system particularly applicable to turbocharging having the advantages described in the foregoing patents and special advantages which may be outlined as follows:

A conventional turbocharger having a fixed geometry, i.e., having flow passages which are not adjustable, can be matched to an engine for only one engine operating condition, and particularly only one engine speed. This limitation is not too objectionable in the case of a constant speed engine operating primarily in the full load range. But, particularly if the engine speed is required to vary, for example to ⅓ of full speed, the torque versus speed curve droops sharply with decreasing engine speed in a fashion which is highly undesirable for variable speed engines such as are used for powering automotive vehicles, earth moving equipment, drill rigs, and the like. Desirably for such uses a constant torque is desired over the entire speed range of normal engine operation, such as in the range from full speed to ⅓ of full speed. This characteristic is achieved in the case of atmospheric aspirated engines; but in the case of turbocharged engines, capable of delivering much higher torque, fixed geometry turbochargers do not give rise to the desired characteristics. Theoretically, the turbocharger size and flow capacity should vary with the engine speed.

If a fixed geometry turbocharger is matched to a four cycle engine for an intermediate speed between full speed and that at the lower end of a desired range, at the lower end of the range the turbocharger will run at higher speed, giving higher pressure ratio, enabling the engine to develop a higher low speed torque. However, there is still considerable droop of torque with drop of engine speed. But if the engine speed is increased above the matching speed, while the normal full load air to fuel ratio is maintained either one of two things, or a combination of the two occurs:

(1) The turbocharger overspeeds to a possibly dangerous degree and develops much more pressure consequently causing the engine to develop more load but with higher firing pressures than it can stand, resulting in mechanically overloading the engine.

(2) If the turbine and compressor efficiencies fall off rapidly with increasing air and gas flow rates, the serious overspeeding may not occur, but in this case the pressure drop between the intake and exhaust of the engine, which should be positive, may become negative, with the result that the engine will smoke, its specific fuel consumption (in pounds of fuel per brake horsepower per hour) will become intolerably high, and the engine will become thermally overloaded before it can develop full load and torque.

If the component efficiencies of a turbocharger are normally high, as will ordinarily be desired, they cannot usually become suddenly very low as would be involved in producing the effects of paragraph (2) above so that the situation of paragraph (1) usually exists and has been corrected by one of the following expedients:

(a) The pre-turbine temperature is reduced sufficiently to prevent excessive overspeeding of the turbocharger by so arranging the fuel control system of the engine that it operates with a higher and higher air to fuel ratio the more the matching engine speed is exceeded and full speed is approached. This is possible only with diesel engines and cannot be done with spark ignition gas engines or Otto cycle carburetor engines.

(b) The speed of the turbocharger is held within bounds by waste gate control of its turbine, part of the engine exhaust gases being bypassed directly from the inlet of the turbine to exhaust without doing work. This is equivalent to having the turbine efficiency become very low (so far as handling all of the exhaust gases is concerned) and results in a negative pressure drop with rapid increase of the specific fuel consumption with smoking and thermal overloading of the engine, as well as reduction of engine torque.

Despite adoption of the above expedients it is not possible to match the turbocharger to the engine for an engine speed sufficiently below full speed to achieve full engine torque at low speeds such as ⅓ of full speed. A high local peak in the torque-speed characteristic occurs at the speed for which matching exists.

What is actually needed to achieve an almost constant high torque over a very wide range of engine speed and prevent the other difficulties described is an arrangement in a turbocompressor in which both the compressor and turbine would be flexible in operation to provide a unit having widely varying capacity at constant speed and constant efficiency so that at low engine speed the turbocharger would be effectively small like a small, fixed geometry, turbocharger, and at high engine speed a capacity corresponding to that of a much larger turbocharger, with, in effect, intermediate sizes of turbochargers between the extreme limits.

Flexibility of the compressor part of a unit is achieved in accordance with my Patents 3,069,072 and 3,232,043, in which variable pre-whirl is provided at the inlet to the compressor. There is thus achieved a variable geometry compressor to maintain constant pressure ratio over a required range of air flow of, for example, 1:3, while maintaining a high efficiency and operation at nearly constant speed through a very large field of stable operation.

The variable pre-whirl compressor has the advantage of bringing about a distinct change of equivalent orifice area of the turbine with which it is associated so that the turbine begins to approach the behavior of a hypothetical flexible turbine. This achieves higher torque at reduced engine speed but it is not sufficient to make possible substantially constant torque over a 1:3 speed range required for operations such as indicated above. Still desired is a variable geometry turbine to drive the compressor having the pre-whirl arrangement. A first thought would be that of achieving variable turbine geometry by adoption of adjustable turbine nozzle guide vanes; but this could not do the job completely because opening the nozzle area in such fashion to the maximum will not increase the "swallowing" ability of the turbine sufficiently to suit the maximum flow requirement before the area of the rotating blade passages becomes a bottleneck to the flow. If such condition is approached, the turbine efficiency drops off to a prohibited extent. Furthermore, as a practical matter, the provision of variable turbine nozzle guide vanes is too complex and expensive for use in turbochargers.

If the variable turbine geometry is achieved by the expedient of using an ordinary wastegate, the turbine flow areas are made sufficiently small to take advantage of the low flow and of the variable pre-whirl compressor characteristic, and if it is further desired to prevent excessive back pressure on the engine, such a large percentage of the total flow must be bypassed through the wastegate that the equivalent turbine efficiency will become so low that the turbine is no longer capable of driving the compressor when the latter is delivering the flow which would correspond to full engine speed. The effects are as described previously involving very high specific fuel consumption, thermal overloading and smoking. The problem involved may be stated to be the design of a turbine for ½ or less of the maximum flow rate of the compressor with variable pre-whirl with the provision of means which will in effect increase the swallowing capacity of the turbine so that the full compressor flow rate can be handled with only a modest increase of the pre-turbine pressure and with an effective turbine efficiency that is high enough to prevent the pressure difference across the engine from becoming negative.

This problem is solved by the invention which provides a turbine capacity augmentation system. In brief, in accordance with the invention, a pressure relief valve bypasses gases from the nozzle box of the turbine to its exhaust chamber to prevent the nozzle box pressure from exceeding a chosen maximum. The nozzle box pressure acts on one side of an annular diaphragm, the other side of which is exposed to approximately atmospheric pressure, the diaphragm being balanced by a spring. The pressure sensitive diaphragm controls a valve which is so shaped that when it opens it forms, in conjunction with its seat, an annular nozzle for converting the pressure drop across the valve into a high velocity flow which is directed substantially in the same direction as the gases discharging from the turbine wheel which are directly inside the valve having the form of a ring. There is thus provided an annular eductor nozzle for energizing the flow leaving the turbine wheel. Momentum transfer occurs in a mixing region directly beyond the outlet from the turbine wheel to provide a gas stream with a mean, mixing velocity that is higher than that of the turbine exhaust velocity but lower than the eductor nozzle velocity. The flow enters a diffuser which serves to convert the kinetic energy of the mixing velocity into a pressure rise which will ordinarily be to atmospheric pressure.

The objective achieved is the provision of a pressure relief bypass valve forming part of a highly efficient eductor utilizing a good percentage of the energy posssessed by the bypass gases to effect lowering of the pressure against which the turbine wheel discharges, thereby increasing the enthalpy drop through the turbine rotor thus increasing its power output. The lower outlet pressure increases the flow rate through the turbine wheel which in turn reduces the percentage of gases that must be bypassed to prevent the nozzle box pressure from exceeding a proper maximum. The last mentioned situation involves an equilibrium of flow condition in which more flow takes place through the highly efficient turbine and less through the lower efficiency eductor.

Figure 2:
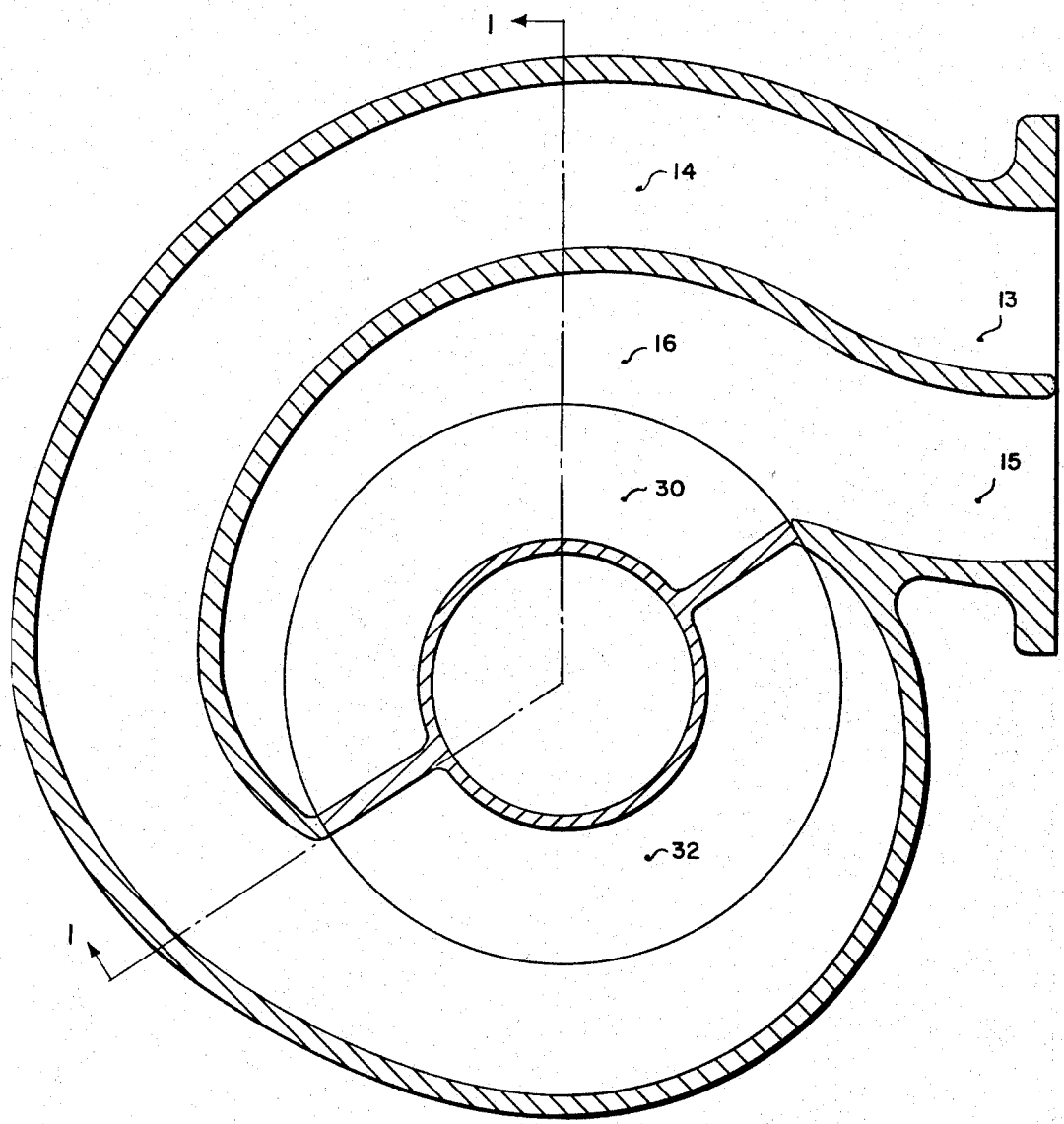

The achievement of the general object indicated and the attainment of other objects relating to optimum results will become apparent from the following description, read in conjunction with the accompanying drawings, in which:

FIGURE 1 is a section through a turbocompressor taken on the broken surface indicated at 1—1 in FIGURE 2, this figure also diagrammatically indicating the association of the turbocompressor unit with an engine; and FIGURE 2 is a radial section taken on the plane indicated at 2—2 in FIGURE 1.

The turbocompressor unit is to a major extent very similar to those shown in my prior patents and applications referred to above, and hence details which are not novel and which form no part of the present invention will be only briefly indicated or described.

The shaft 2 mounts the turbine rotor 4 and is supported in bearings of which one is indicated at 6, an Archimedes screw type of shaft seal being indicated at 8. The turbine blades are indicated at 10 and are desirably of the type described in my Patent 3,232,580. The turbine passages are exteriorly bounded by the portion 12 of the casing and are advantageously of the form described in my prior patents referred to above and need not be detailed.

While the exhaust gases from the engine may be handled as a single flow, FIGURE 2 indicates a pair of entrance passageways 13 and 15 which are connected to separate groups of cylinders having non-overlapping exhaust pulses, the entrance passageways communicating with the respective exhaust gas chests 14 and 16. Through annularly arranged fixed nozzles provided by vanes 18 and 20 the gases are directed to the turbine blading in usual fashion to provide drive of the turbine.

Beyond the exit portions of the turbine blades there is the mixing chamber 22 which continues as an annular conical diffuser passage 24 communicating with an exhaust chamber 26 to discharge the gases at 28 through such directing conduit as may be desired. During operation the exhaust chamber 26 will be essentially at atmospheric pressure under most conditions of use.

The gas chests 14 and 16 communicate through passages 30 and 32 with an annular chamber 34. If desired, suitable spin may be imparted to the exhaust gases within the chamber 34 by provision of guide vanes to provide flow in a direction opposite that of flow produced by the nozzles 18 and 20 and the direction of rotation of the shaft 2.

The inner wall of the chamber 34 is in the form of an annular valve seat 36. A valve 38 in the form of an annular ring is movable with respect to the seat 36 and provides with it an annular nozzle passage 40. The cross-section to flow offered by it varies in size with the spacing of the valve member 38 from the seat 36. The valve member is secured to the interior of an annular flexible metallic diaphragm 42, the outer periphery of which is anchored in the casing. A plurality of springs 44 provided about the valve member 38 urge it toward closed position. The valve member 38 is centered and guided for axial movement by a cylindrical surface 46 provided by the casing. A passage 48 provides communication between the right-hand surface of the diaphragm 42 and the exhaust gas receiving chamber 26 which, as stated, is ordinarily at approximately atmospheric pressure.

The impeller 50 which is of the type shown in my Patent 3,069,072 is also carried by the shaft 2 and is provided by the vanes 52 bounded in usual fashion by the housing, discharge being into the diffuser 54 and thence into the air chamber 56 from which flow takes place to the engine 58. Controls are provided in accordance with either my Patent 3,059,415 or my Patent 3,232,043. Involved are provisions for adjustment of pre-whirl vanes 60 in accordance with the last patents, control devices being associated with the engine and other elements as described therein.

Operation is as follows:

Assuming that matching is provided for some speed conditions between maximum and minimum of the engine, under low engine speed conditions the pressure within the chamber 34 will not be sufficient to overcome the springs 44 and consequently the valve member 38 will be in its closed position. Accordingly, and in accordance with my prior patents referred to above control of pre-whirl of the air entering the impeller will be effective to maintain the speed of the turbocompressor unit to secure proper operation of the entire power plant and in a fashion to maintain constant and adequate engine torque down to a minimum operating speed such as ⅓ of maximum engine speed. This operation does not involve the novel aspects of the present invention and need not be described in detail, reference being made to the prior patents.

However, when the engine operates at speeds higher than the matched speed, the turbine will no longer be able to accept the increased flow of exhaust gases from the engine, without the pressure building up in the chamber 34 at the left of the diaphragm 42 such that the diaphragm will be moved against the springs 44 opening the annular nozzle passage 40 to the extent determined by the differential pressure between the chamber 34 and atmosphere. A bypass of flow is thus provided preventing substantial increase of pressure in the gas chests 14 and 16. The pressure drop across the nozzle 40 will produce high velocity of flow considerably exceeding that of the exhaust gases from the turbine passages, and eductor action takes place with exchange of momentum giving rise in the mixing chamber 22 to a resultant velocity greater than that of the exit of gases from the turbine but less than that of the gases from the nozzle 40. While the gases emitted from the turbine blading will have little or no rotation, it is generally unnecessary to provide a rotational component of flow to the gases passing through the nozzle 40.

As the gases pass outwardly through the diffuser 24 they lose kinetic energy which is converted into a pressure rise, and since the chamber 26 at the diffuser outlet is at essentially atmospheric pressure, the absolute pressure in the mixing region 22 becomes lower with the result that the turbine is discharging to a pressure which is substantially below atmospheric pressure. This increases the enthalpy drop through the turbine which means that a part of the energy in the bypassed gases is made available to the turbine and at the same time the reduced exhaust pressure of the turbine makes it capable of swallowing more entering gas which in turn, in effect, reduces the pressure in the gas chest 14 and 16 and hence in the chamber 34. The result is an equilibrium condition in which there is effectually more gas flowing through the efficient turbine and less through the relatively inefficient eductor, aiding and to maintain the overall efficiency of the turbocharger relatively high. By reason of the actions just described, there do not exist the objectionable characteristics described previously. While so far as the turbine is concerned there is a partial wasting of gases, there is not an actual wasting since the eductor makes the turbine more capable of handling more gases and of delivering the extra power which is called for in driving the compressor to provide the demand of air by the engine. This results in a maintenance of operation of the engine to produce adequate torque without involving the thermal overloading and smoking and the conditions referred to above.

The result is maintenance of proper torque over a very wide range of engine speeds.

One of the advantages of the invention from a practical standpoint lies in the great simplicity of the control system involved which from the standpoint of moving parts presents only the diaphragm 42, the valve member 38 and the springs 44. No external connections of this control to engine controls are needed.

It will be evident that various changes may be made in the embodiments of the invention without departing from its scope as defined in the following claims.

What is claimed is:

1. In a turbocharged engine power plant, an internal combustion engine, a turbine, a compressor driven by said turbine, means for leading exhaust gases from said engine to said turbine to drive the latter, means for leading air delivered from said compressor to said engine to support combustion of fuel in the engine, a nozzle, and means for leading exhaust gases from said engine to said nozzle, said nozzle being directed to provide a high velocity jet of the exhaust gases to mix with, and provide an eductor action on, the gases exhausted from said turbine.

2. In a turbocharged engine power plant, an internal combustion engine, a turbine, a compressor driven by said turbine, means for leading exhaust gases from said engine to said turbine to drive the latter, means for leading air delivered from said compressor to said engine to support combustion of fuel in the engine, a nozzle, means for leading exhaust gases from said engine to said nozzle, said nozzle being directed to provide a high velocity jet of the exhaust gases to mix with, and provide an eductor action on, the gases exhausted from said turbine, and a diffuser receiving the admixed gases from the nozzle and turbine.

3. In a turbocharged engine power plant, an internal combustion engine, a turbine, a compressor driven by said turbine, means for leading exhaust gases from said engine to said turbine to drive the latter, means for leading air delivered from said compressor to said engine to support combustion of fuel in the engine, a nozzle, means for leading exhaust gases from said engine to said nozzle, said nozzle being directed to provide a high velocity jet of the exhaust gases to mix with, and provide an eductor action on, the gases exhausted from said turbine, said nozzle being adjustable to vary the cross-section of its flow passage, and means adjusting said cross-section in accordance with the pressure of the engine exhaust gases to effect increase of said nozzle passage cross-section with increase of said pressure and vice versa.

4. In a turbocharged engine power plant, an internal combustion engine, a turbine, a compressor driven by said turbine, means for leading exhaust gases from said engine to said turbine to drive the latter, means for leading air delivered from said compressor to said engine to support combustion of fuel in the engine, a nozzle, means for leading exhaust gases from said engine to said nozzle, said nozzle being directed to provide a high velocity jet of the exhaust gases to mix with, and provide an eductor action on, the gases exhausted from said turbine, said nozzle being adjustable to vary the cross-section of its flow passage, and means adjusting said cross-section in accordance with the pressure of the engine exhaust gases to effect opening of the nozzle when said pressure increases and closing thereof when said pressure decreases.

5. In a turbocharged engine power plant, an internal combustion engine, a turbine, a compressor driven by said turbine, means for leading exhaust gases from said engine to said turbine to drive the latter, means for leading air delivered from said compressor to said engine to support combustion of fuel in the engine, a nozzle, means for leading exhaust gases from said engine to said nozzle, said nozzle being directed to provide a high velocity jet of the exhaust gases to mix with, and provide an eductor action on, the gases exhausted from said turbine, a diffuser receiving the admixed gases from the nozzle and the turbine, said nozzle being adjustable to vary the cross-section of its flow passage, and means adjusting said cross-section in accordance with the pressure drop between the engine exhaust gases and the discharge end of the diffuser to effect increase of said nozzle passage cross-section with increase of said pressure drop and vice versa.

6. In a turbocharged engine power plant, an internal combustion engine, a turbine, a compressor driven by said turbine, means for leading exhaust gases from said engine to said turbine to drive the latter, means for leading air delivered from said compressor to said engine to support combustion of fuel in the engine, a nozzle, and means for leading exhaust gases from said engine to said nozzle, said nozzle being directed to provide a high velocity jet of the exhaust gases to mix with, and provide an eductor action on, the gases exhausted from said turbine, said nozzle being annular in form and surrounding the region of discharge of gases from the turbine.

7. In a turbocharged engine power plant, an internal combustion engine, a turbine, a compressor driven by said turbine, means for leading exhaust gases from said engine to said turbine to drive the latter, means for leading air delivered from said compressor to said engine to support combustion of fuel in the engine, a nozzle, means for leading exhaust gases from said engine to said nozzle, said nozzle being directed to provide a high velocity jet of the exhaust gases to mix with, and provide an eductor action on, the gases exhausted from said turbine, said nozzle being annular in form and surrounding the region of discharge of gases from the turbine, and a diffuser receiving the admixed gases from the nozzle and turbine.

8. In a turbocharged engine power plant, an internal combustion engine, a turbine, a compressor driven by said turbine, means for leading exhaust gases from said engine to said turbine to drive the latter, means for leading air delivered from said compressor to said engine to support combustion of fuel in the engine, a nozzle, and means for leading exhaust gases from said engine to said nozzle, said nozzle being directed to provide a high velocity jet of the exhaust gases to mix with, and provide an eductor action on, the gases exhausted from said turbine, said nozzle being annular in form and surrounding the region of discharge of gases from the turbine, said nozzle being bounded by fixed and movable annular elements, the movable element being mounted on a diaphragm exposed on one side to the pressure of gases entering the nozzle to effect opening of the nozzle with increase of said pressure.

9. In a turbocharged engine power plant, an internal combustion engine, a turbine, a compressor driven by said turbine, means for leading exhaust gases from said engine to said turbine to drive the latter, means for leading air delivered from said compressor to said engine to support combustion of fuel in the engine, a nozzle, and means for leading exhaust gases from said engine to said nozzle, said nozzle being directed to provide a high velocity jet of the exhaust gases to mix with, and provide an eductor action on, the gases exhausted from said turbine, said nozzle being annular in form and surrounding the region of discharge of gases from the turbine, said nozzle being bounded by fixed and movable annular elements, the movable element being mounted on a diaphragm exposed on one side to the pressure of gases entering the nozzle to effect opening of the nozzle with increase of said pressure, and spring means urging the movable element of the nozzle towards closed position.

10. In combination with a device for producing combustion gases, means for supplying fuel to said device, a turbine, a compressor driven by said turbine, means for leading combustion gases from said device to said turbine to drive the latter, means for leading air delivered from said compressor to said device to support combustion of fuel therein, a nozzle, and means for leading combustion gases from said device to said nozzle, said nozzle being directed to provide a high velocity jet of the combustion gases to mix with, and provide an eductor action on, the gases exhausted from said turbine, and a diffuser receiving the admixed gases from the nozzle and turbine.

11. In combination with a device for producing combustion gases, means for supplying fuel to said device, a turbine, a compressor driven by said turbine, means for leading combustion gases from said device to said turbine to drive the latter, means for leading air delivered from said compressor to said device to support combustion of fuel therein, a nozzle, and means for leading combustion gases from said device to said nozzle, said nozzle being directed to provide a high velocity jet of the combustion gases to mix with, and provide an eductor action on, the gases exhausted from said turbine, said nozzle being adjustable to vary the cross-section of its flow passage, and means adjusting said cross-section in accordance with the pressure of the combustion gases to effect increase of said nozzle passage cross-section with increase of said pressure and vice versa.

12. In combination with a device for producing combustion gases, means for supplying fuel to said device, a turbine, a compressor driven by said turbine, means for leading combustion gases from said device to said turbine to drive the latter, means for leading air delivered from said compressor to said device to support combustion of fuel therein, a nozzle, and means for leading combustion gases from said device to said nozzle, said nozzle being directed to provide a high velocity jet of the combustion gases to mix with, and provide an eductor action on, the gases exhausted from said turbine, said nozzle being adjustable to vary the cross-section of its flow passage, and means adjusting said cross-section in accordance with the pressure of the combustion gases to effect opening of the nozzle when said pressure increases and closing thereof when said pressure decreases.

13. In combination with a device for producing combustion gases, means for supplying fuel to said device, a turbine, a compressor driven by said turbine, means for leading combustion gases from said device to said turbine to drive the latter, means for leading air delivered from said compressor to said device to support combustion of fuel therein, a nozzle, and means for leading combustion gases from said device to said nozzle, said nozzle being directed to provide a high velocity jet of the combustion gases to mix with, and provide an eductor action on, the gases exhausted from said turbine, a diffuser receiving the admixed gases from the nozzle and the turbine, said nozzle being adjustable to vary the cross-section of its flow passage, and means adjusting said cross-section in accordance with the pressure drop between the combustion gases and the discharge end of the diffuser to effect increase of said nozzle passage cross-section with increase of said pressure drop and vice versa.

14. In combination with a device for producing combustion gases, means for supplying fuel to said device, a turbine, a compressor driven by said turbine, means for leading combustion gases from said device to said turbine to drive the latter, means for leading air delivered from said compressor to said device to support combustion of fuel therein, a nozzle, and means for leading combustion gases from said device to said nozzle, said nozzle being directed to provide a high velocity jet of the combustion gases to mix with, and provide an eductor action on, the gases exhausted from said turbine, said nozzle being annular in form and surrounding the region of discharge of gases from the turbine, and a diffuser receiving the admixed gases from the nozzle and turbine.

15. In combination with a device for producing combustion gases, means for supplying fuel to said device, a turbine, a compressor driven by said turbine, means for leading combustion gases from said device to said turbine to drive the latter, means for leading air delivered from said compressor to said device to support combustion fuel therein, a nozzle, and means for leading combustion gases from said device to said nozzle, said nozzle being directed to provide a high velocity jet of the combustion gases to mix with, and provide an eductor action on the gases exhausted from said turbine, said nozzle being annular in form and surrounding the region of discharge of gases from the turbine, said nozzle being bounded by fixed and movable annular elements, the movable element being mounted on a diaphragm exposed on one side to the pressure gases entering the nozzle to effect opening of the nozzle with increase of said pressure.

16. In combination with a device for producing combustion gases, means for supplying fuel to said device, a turbine, a compressor driven by said turbine, means for leading combustion gases from said device to said turbine to drive the latter, means for leading air delivered from said compressor to said device to support combustion of fuel therein, a nozzle, and means for leading combustion gases from said device to said nozzle, said nozzle being directed to provide a high velocity jet of the combustion gases to mix with, and provide an eductor action on, the gases exhausted from said turbine, said nozzle being annular in form and surrounding the region of discharge of gases from the turbine, said nozzle being bounded by fixed and movable annular elements, the movable element being mounted on a diaphragm exposed on one side to the pressure of gases entering the nozzle to effect opening of the nozzle with increase of said pressure, and spring means urging the movable element of the nozzle towards closed position.

References Cited
UNITED STATES PATENTS

| | | | |
|---|---|---|---|
| 3,204,403 | 9/1965 | Mordell | 60—39.25 X |
| 3,270,495 | 9/1966 | Connor | 60—13 |

RALPH D. BLAKESLEE, *Primary Examiner.*